United States Patent Office 3,043,853
Patented July 10, 1962

3,043,853
NEW 1-ACYL-1-(2-CYANO-ETHYL)-2-(5-NITROFUR-FURYLIDENE)HYDRAZINES AND THE PREPARATION THEREOF
Frank F. Ebetino, Norwich, N.Y., assignor to The Norwich Pharmacal Company, Norwich, N.Y., a corporation of New York
No Drawing. Filed Feb. 23, 1960, Ser. No. 10,040
5 Claims. (Cl. 260—347.3)

This invention relates to a series of new chemical compounds which are highly effective chemotherapeutic agents upon oral administration, the preparation thereof, and a new compound that is useful as an intermediate in the preparation of members of my new series of chemotherapeutic agents. Such series may be characterized as 1-acyl - 1 - (2 - cyanoethyl) - 2 - (5 - nitrofurfurylidene)-hydrazine compounds which may be represented by the formula:

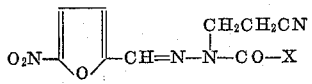

in which X represents a member of the group consisting of amino and lower alkyl.

I have discovered that the members of my series of new compounds possess a high order of systemic therapeutic activity when administered to hosts infected with various pathogenic microorganisms at dosages causing no manifestation of toxic effect.

Chickens infected with a heavy inoculum of the *Eimeria tenella* organism, the causative agent of cecal coccidiosis, are protected against the ravages of that disease through the administration in their diet of 0.011% by weight of my new compounds. Mice lethally challenged with *Staphylococcus aureus* are spared to the extent of 80% by the peroral administration post infection of 210 mg./kg. of members of my series.

My new compounds are relatively nontoxic; a dose of 2200 mg./kg. being tolerated without ill effect by mice.

The compounding and formulating of my new compounds in dosage forms capable of ready administration is easily accomplished in accordance with accepted practice in the art. Tablets, suspensions, capsules and like dosage forms containing my new compounds in desired quantity can be readily prepared using excipients, adjuvants and carriers conventionally employed. In veterinary use the admixture of my new compounds in the feed or drinking water supply serves to provide an ingestible dosage form.

The new chemical compound which I have found to be a valuable synthetic intermediate in the preparation of members of my series is 5-nitrofurfurylidene 2-cyanoethyl hydrazone.

It is a particular feature of my invention that my new 1 - acyl - 1 - (2 - cyanoethyl) - 2 - (5 - nitrofurfurylidene)hydrazine compounds can be prepared in a facile manner from a readily available starting compound, namely, 2-cyanoethylhydrazine:

(1) In the preparation of my new 1-alkanoyl-1-(2-cyanoethyl) - 2 - (5 - nitrofurfurylidene)hydrazine compounds, that starting compound is condensed with 5-nitrofurfural to yield 5-nitrofurfurylidene-2-cyanoethyl-hydrazone which is acylated by subjecting it to treatment with an alkanoic acid anhydride under the influence of heat to produce the desired end product; or the starting compound, 2-cyanoethylhydrazine, is condensed with a suitable carbonyl compound such as acetone or benzaldehyde and the hydrazone thus obtained is subjected to acylation to produce an intermediate which is subjected to carbonyl compound exchange with 5-nitrofurfural.

(2) The 1 - carbamyl - 1 - (2 - cyanoethyl) - 2 - (5-nitrofurfurylidene)hydrazine that I have invented can be prepared by subjecting a salt (e.g. the sulfate) of the starting compound, 2-cyanoethylhydrazine, to cyanation to form the semicarbazide and such semicarbazide can then be readily condensed with nitrofurfural to provide the end product.

In the preparation of my new compounds as summarized above, I may use in lieu of 5-nitrofurfural a derivative thereof such as 5-nitrofurfural diacetate which, under the reaction conditions, is hydrolyzable to 5-nitrofurfural.

In order that the practice of my invention may be completely available to those skilled in the art, the following illustrative examples are given:

EXAMPLE I

*1-Acetyl-1-(2-Cyanoethyl)-2-(5-Nitro-2-Furfurylidene)Hydrazine*

31 g. (0.389 mole) of 5-nitrofurfurylidene 2-cyanoethylhydrazone (M.P. 132–133°), prepared by condensing 5-nitrofurfural with 2-cyanoethylhydrazine in a manner customary for such condensation, and 150 ml. of acetic anhydride are heated at reflux for 15 minutes. The dark solution is cooled in an ice bath, and the precipitated orange-red solid filtered and slurried with ethanol and again filtered. The dried solid weighs 82 g.; M.P. 185.5–188°. The crude solid may be recrystallized from a mixture of 300 ml. of nitromethane and 450 ml. of ethanol, clarified with charcoal, and rinsed with a mixture of 30 ml. of nitromethane and 60 ml. of ethanol. The yield of orange solid, 1-acetyl-1-(2-cyanoethyl)-2-(5-nitro-2-furfurylidene)hydrazine, is 70 g. (72%) M.P. 188–190°.

EXAMPLE II

*1-Butyryl-1-(2-Cyanoethyl)-2-(5-Nitrofurfurylidene)Hydrazine*

81 g. (0.389 mole) of 5-nitrofurfurylidene 2-cyanoethylhydrazone is treated with 160 ml. of butyric anhydride and 8 ml. of pyridine, and heated at 125–135° until a yellow solid separates on cooling the reaction mixture. The reaction is then further cooled in an ice bath, the yellow-orange solid filtered and washed twice with ethanol. The yield is 71 g. of 1-butyryl-1-(2-cyanoethyl)-2-(5-nitrofurfurylidene)hydrazine (65.6%) M.P. 129–131°. It may be recrystallized from 1200 ml. of isopropanol to give 66 g. M.P. 131–132°.

EXAMPLE III

*1-Carbamyl-1-(2-Cyanoethyl)-2-(5-Nitrofurfurylidene)Hydrazine*

To a solution of 8.1 g. of potassium cyanate dissolved in 100 ml. of water is added 13.4 g. of 2-cyanoethylhydrazine sulfate in portions while maintaining a pH of about 6–6.5. After addition the solution is further acidified with hydrochloric acid. To it is added, with stirring, a solution of 14.1 g. of 5-nitrofurfural in 100 ml. of ethanol. After a brief induction period a solid is deposited which is filtered, washed well with alcohol and water and finally dried. There are obtained 6.5 g. (25%) of 1-carbamyl - 1 - (2 - cyanoethyl) - 2 - (5 - nitrofurfurylidene)-hydrazine; M.P. 223–226°. It may be recrystallized with nitromethane.

What I claim is:
1. A compound having chemotherapeutic activity upon oral administration and represented by the formula:

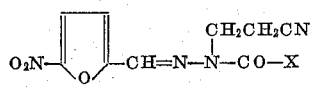

in which X represents a member of the group consisting of amino and lower alkyl.

2. The compound 1-carbamyl-1-(2-cyanoethyl)-2-(5-nitrofurfurylidene)hydrazine represented by the formula:

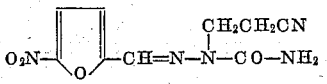

3. The compound 1-acetyl-1-(2-cyanoethyl)-2-(5-nitrofurfurylidene)hydrazine represented by the formula:

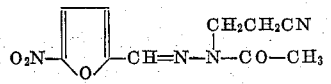

4. The compound 1-butyryl-1-(2-cyanoethyl)-2-(5-nitrofurfurylidene)hydrazine represented by the formula:

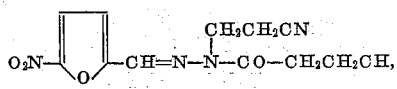

5. The compound 5-nitrofurfurylidene 2-cyanoethylhydrazone represented by the formula:

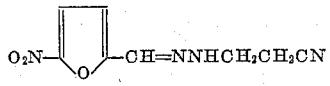

References Cited in the file of this patent
UNITED STATES PATENTS

| | | |
|---|---|---|
| 2,416,234 | Stillman et al. | Feb. 18, 1947 |
| 2,416,236 | Stillman et al. | Feb. 18, 1947 |

OTHER REFERENCES

Karrer: Organic Chemistry (2nd English ed., 1946), page 210.

Whitmore: Organic Chemistry (D. Van Nostrand, second edition, 1951), pp. 292–293, 299 and 450.